(12) United States Patent
Irie et al.

(10) Patent No.: US 12,387,501 B2
(45) Date of Patent: Aug. 12, 2025

(54) INFORMATION PROCESSING APPARATUS AND INFORMATION PROCESSING METHOD FOR IDENTIFYING EXTERIOR ENVIRONMENT OF VEHICLE

(71) Applicant: SONY GROUP CORPORATION, Tokyo (JP)

(72) Inventors: Daisuke Irie, Tokyo (JP); Shuichi Takahashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 427 days.

(21) Appl. No.: 17/783,767

(22) PCT Filed: Dec. 10, 2020

(86) PCT No.: PCT/JP2020/046163
§ 371 (c)(1),
(2) Date: Jun. 9, 2022

(87) PCT Pub. No.: WO2021/125063
PCT Pub. Date: Jun. 24, 2021

(65) Prior Publication Data
US 2023/0005273 A1    Jan. 5, 2023

(30) Foreign Application Priority Data

Dec. 18, 2019 (JP) ................... 2019-227970

(51) Int. Cl.
*G06V 20/56* (2022.01)
*G06T 7/10* (2017.01)
(Continued)

(52) U.S. Cl.
CPC ............... *G06V 20/56* (2022.01); *G06T 7/10* (2017.01); *G06T 7/70* (2017.01); *G06V 10/82* (2022.01); *G06T 2207/20081* (2013.01)

(58) Field of Classification Search
CPC ...... G06V 10/26; G06V 10/454; G06V 10/82; G06V 20/56; G06T 7/10; G06T 7/70;
(Continued)

(56) References Cited

U.S. PATENT DOCUMENTS 6,085,092 A * 7/2000 Schmidt ............... H04W 16/00
455/442
2012/0033123 A1* 2/2012 Inoue ..................... H04N 7/181
348/333.13
(Continued)

FOREIGN PATENT DOCUMENTS

CN       102201111 A    9/2011
CN       104335570 A    2/2015
(Continued)

OTHER PUBLICATIONS

University of Illinois "What is a dateline", https://www.library.illinois.edu/village/globalnews/mod1/pg17.htm#:~:text=The%20dateline%20of%20a%20news,indicate%20the%20place%20of%20publication. (Year: 2019).*
(Continued)

*Primary Examiner* — Gregory A Morse
*Assistant Examiner* — Stefano Anthony Dardano
(74) *Attorney, Agent, or Firm* — CHIP LAW GROUP

(57) ABSTRACT

To enhance identification accuracy for the external environment of a movable object.
Acquired is image data having an image feature (such as area, date and time, and weather) corresponding to a movement scene of the movable object. Learning with the image data is performed to acquire an inference DNN coefficient for identification of the external environment of the movable object from the image data of the movement scene. For example, the external environment is identified on the basis of, for example, semantic segmentation or depth. The infer-
(Continued)

ence DNN to which the inference DNN coefficient is set enables accurate identification of the external environment of the movable object from the image data of the movement scene.

12 Claims, 10 Drawing Sheets

(51) Int. Cl.
*G06T 7/70* (2017.01)
*G06V 10/82* (2022.01)

(58) Field of Classification Search
CPC ............ G06T 2207/30252–30264; G06T 2207/30236; G06T 7/20; G06T 2207/10028; G06T 2207/20081; G06T 2207/20084; G08G 1/00; G08G 1/09; G08G 1/16
See application file for complete search history.

(56) References Cited

U.S. PATENT DOCUMENTS

| | | | |
|---|---|---|---|
| 2014/0160325 A1 | 6/2014 | Hirai | |
| 2018/0336426 A1 | 11/2018 | Suzuki et al. | |
| 2019/0279082 A1* | 9/2019 | Moloney | G06V 10/82 |
| 2019/0294934 A1* | 9/2019 | Shestak | G06V 20/56 |
| 2020/0250451 A1* | 8/2020 | Oda | G06V 10/87 |
| 2020/0272899 A1* | 8/2020 | Dunne | G06N 3/08 |
| 2021/0312725 A1* | 10/2021 | Milton | G07C 5/008 |
| 2022/0202348 A1* | 6/2022 | Laszlo | A61B 5/7475 |

FOREIGN PATENT DOCUMENTS

| | | |
|---|---|---|
| CN | 105912500 A | 8/2016 |
| CN | 107045788 A | 8/2017 |
| CN | 108920805 A | 11/2018 |
| CN | 108932470 A | 12/2018 |
| CN | 109829469 A | 5/2019 |
| CN | 110555465 A | 12/2019 |
| DE | 102017007136 A1 | 1/2019 |
| EP | 2119393 A1 | 11/2009 |
| JP | 2018-195237 A | 12/2018 |
| JP | 2019164611 A * | 9/2019 |
| KR | 20190063582 A | 6/2019 |

OTHER PUBLICATIONS

International Search Report and Written Opinion of PCT Application No. PCT/JP2020/046163, issued on Feb. 16, 2021, 08 pages of ISRWO.
Digital Technology & Application, vol. 36, No. 4 Shang Guo-jun et al., Real-time Vehicle Detection Algorithm for Traffic Based on Transfer Learning pp. 123-124 Apr. 30, 2018.

* cited by examiner

IDENTIFICATION RESULT BASED ON SEMANTIC SEGMENTATION

TRAVELING SCENE

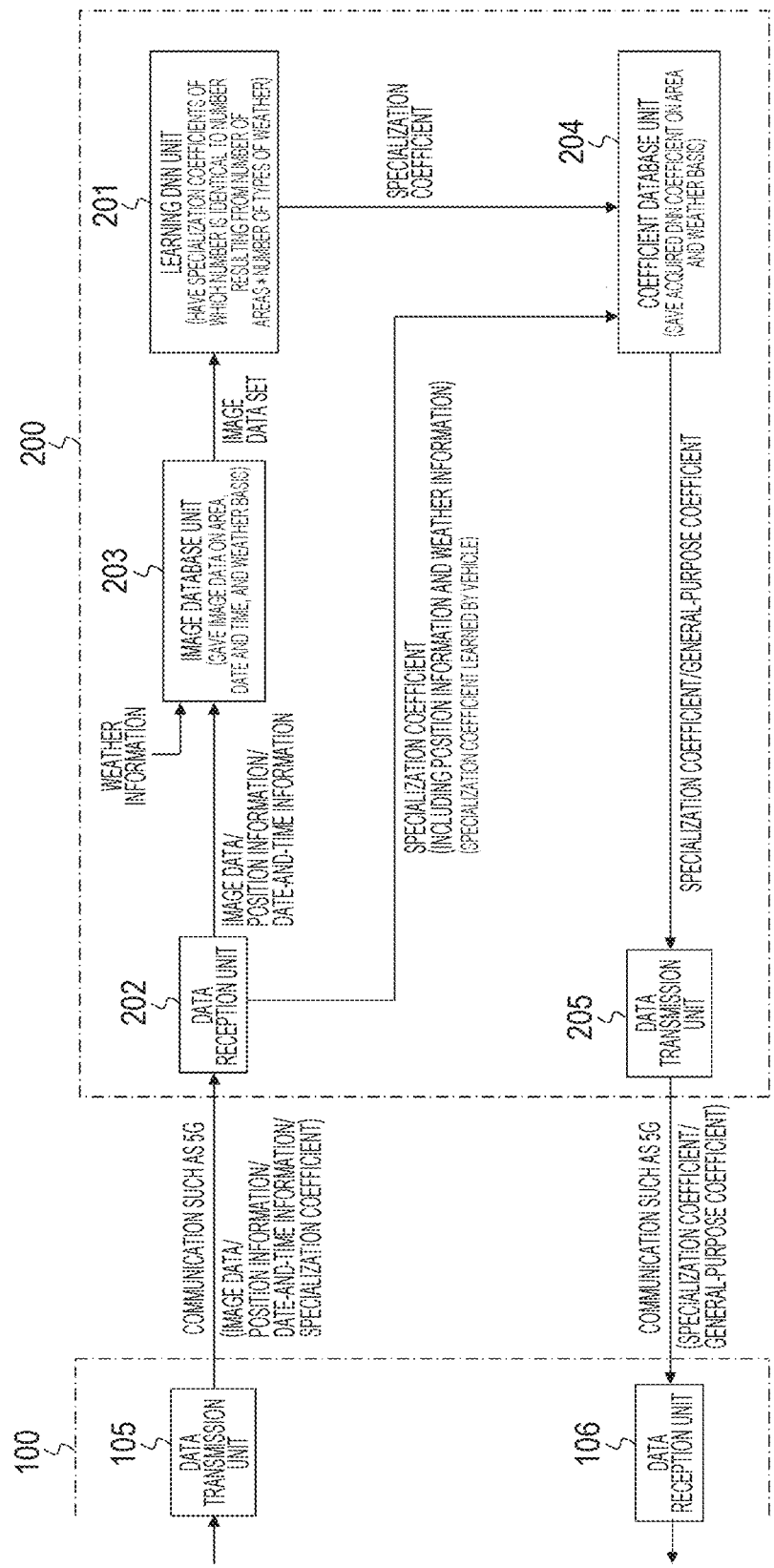

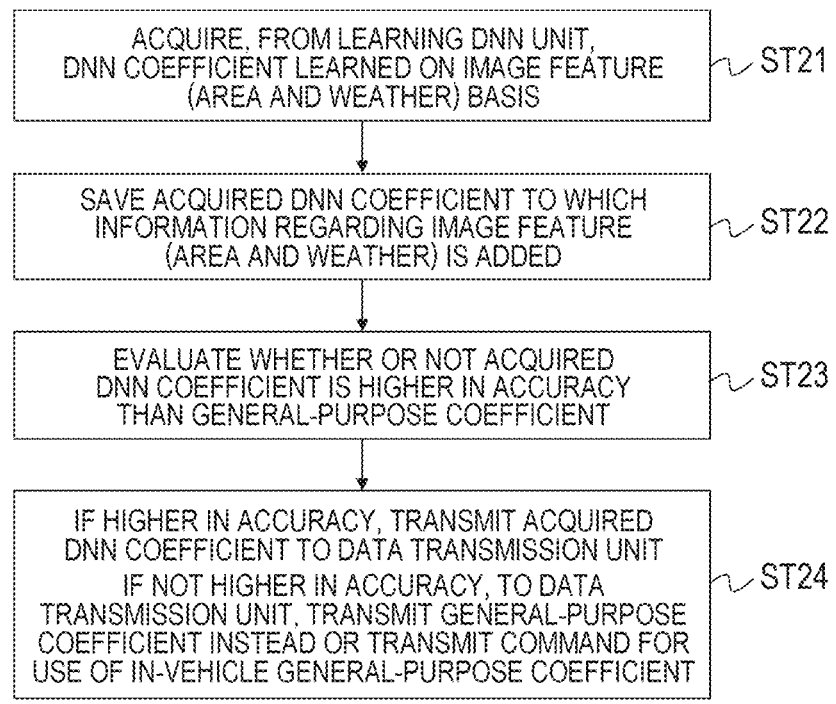
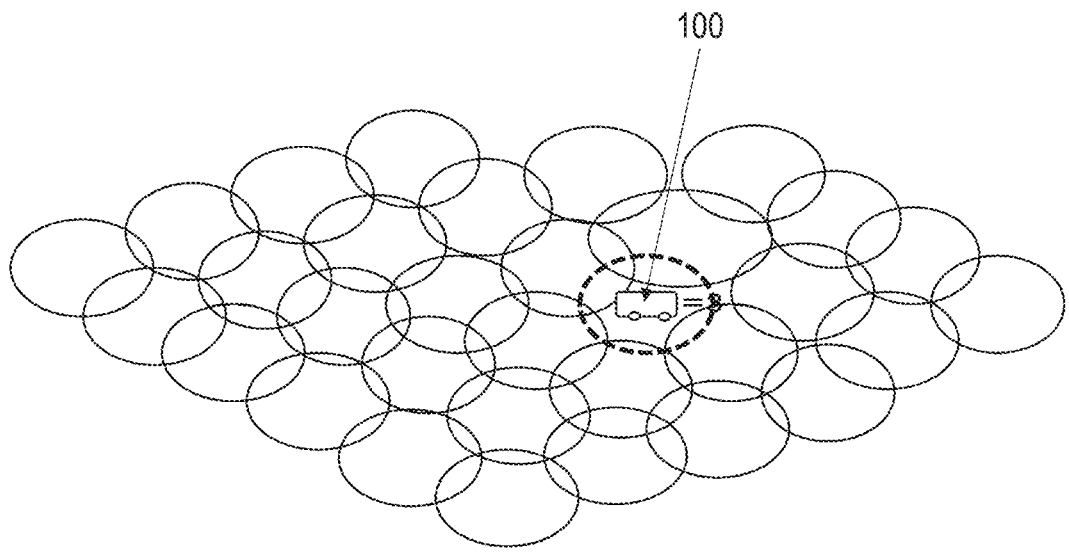

INFORMATION PROCESSING APPARATUS AND INFORMATION PROCESSING METHOD FOR IDENTIFYING EXTERIOR ENVIRONMENT OF VEHICLE

CROSS REFERENCE TO RELATED APPLICATIONS

This application is a U.S. National Phase of International Patent Application No. PCT/JP2020/046163 filed on Dec. 10, 2020, which claims priority benefit of Japanese Patent Application No. JP 2019-227970 filed in the Japan Patent Office on Dec. 18, 2019. Each of the above-referenced applications is hereby incorporated herein by reference in its entirety.

TECHNICAL FIELD

The present technology relates to an information processing apparatus, an information processing method, a program, and a movable object, and particularly, to an information processing apparatus and others for enhancing the identification accuracy for the external environment of the movable object.

BACKGROUND ART

Conventionally, an automated driving vehicle is equipped with an in-vehicle camera, identifies an external environment on the basis of image data of a traveling scene, and automatically controls driving using the result of the identification. For example, the identification result is based on semantic segmentation or depth. Because it is directly linked to safety, very high accuracy is required for identifying the external environment.

In order to identify image data of a traveling scene, it is known to use a deep neural network (DNN) as a machine learning technique. In this case, learning is performed with image data of a traveling scene actually captured by the in-vehicle camera, so that inference DNN coefficients are acquired in advance.

In identification of an external environment based on the image data of the traveling scene using the DNN, a large gap between the image data of the traveling scene and the image data of the traveling scene used for the learning results in a decrease in the accuracy of the identification result. Use of image data of as many scenes as possible in learning results in an increase in the accuracy of the identification result to some extent. However, it is impossible to perform learning covering image data of various scenes in the whole world.

For example, Patent Document 1 discloses that elimination of the deviation in the amount of learning data for each capturing position enables acquisition of a general-purpose learning coefficient.

CITATION LIST

Patent Document

Patent Document 1: Japanese Patent Application Laid-Open No. 2018-195237

SUMMARY OF THE INVENTION

Problems to be Solved by the Invention

An object of the present technology is to improve identification accuracy for the external environment of a movable object.

Solutions to Problems

According to a concept of the present technology, provided is an information processing apparatus including:

an image-data acquisition unit configured to acquire image data having an image feature corresponding to a movement scene of a movable object; and a learning DNN unit configured to perform learning with the image data acquired by the image-data acquisition unit to acquire an inference DNN coefficient for identification of an external environment of the movable object from the image data of the movement scene.

In the present technology, the image-data acquisition unit acquires the image data having the image feature corresponding to the movement scene of the movable object. For example, the image feature may include a position element. In this case, for example, the image feature may further include a weather element or a date-and-time element.

The learning DNN unit performs learning with the image data acquired by the image-data acquisition unit to acquire the inference DNN coefficient for identification of the external environment of the movable object from the image data of the movement scene. For example, on the basis of the inference DNN coefficient in a first time zone, the learning DNN unit may perform transfer learning with the image data acquired by the image-data acquisition unit to acquire the inference DNN coefficient to be used in a second time zone following the first time zone.

As described above, in the present technology, learning is performed with image data having an image feature corresponding to a movement scene of a movable object, and an inference DNN coefficient for identification of the external environment of the movable object from the image data of the movement scene is acquired. The inference DNN to which the inference DNN coefficient is set enables accurate identification of the external environment of the movable object from the image data of the movement scene.

Note that in the present technology, for example, the information processing apparatus may further include an image-data reception unit configured to receive, from the movable object, the image data of the movement scene with position information and date-and-time information added to the image data. Further, in the present technology, for example, the information processing apparatus may further include a coefficient transmission unit configured to transmit, to the movable object, the inference DNN coefficient acquired by the learning DNN unit. In this case, for example, when an evaluation value of the inference DNN coefficient acquired by the learning DNN unit is higher than an evaluation value of a general-purpose coefficient, the coefficient transmission unit may transmit, to the movable object, the inference DNN coefficient acquired by the learning DNN unit. This arrangement enables the movable object to use a coefficient having a higher evaluation value.

Further, according to another concept of the present technology, provided is a movable object including:

an inference DNN unit configured to identify an external environment from image data of a movement scene;

a control unit configured to control movement on the basis of an identification result from the inference DNN unit; and a coefficient reception unit configured to receive, from a cloud server, an inference DNN coefficient to be used by the inference DNN unit, in which the inference DNN coefficient has been acquired by performing learning with the image data having an image feature corresponding to the movement scene.

In the present technology, the movable object includes the inference DNN unit for identification of the external environment from the image data of the movement scene. The control unit controls the movement on the basis of the identification result from the inference DNN unit. Further, the coefficient reception unit receives, from the cloud server, the inference DNN coefficient to be used by the inference DNN unit. Here, the inference DNN coefficient has been acquired by performing the learning with the image data having the image feature corresponding to the movement scene.

As described above, in the present technology, an inference DNN coefficient has been acquired by performing learning with image data having an image feature corresponding to a movement scene, and the inference DNN coefficient to be used by the inference DNN unit is received from the cloud server. This arrangement enables the inference DNN unit to identify accurately the external environment of the movable object from the image data of the movement scene.

Note that in the present technology, for example, the movable object may further include an image-data transmission unit configured to transmit, to the cloud server, the image data of the movement scene with position information and date-and-time information added to the image data. This arrangement enables provision of the image data of the movement scene to the cloud server. Further, the position information regarding this movable object can be provided to the cloud server, and an inference DNN coefficient corresponding to an area in which this movable object is moving can be easily received from the cloud server.

Furthermore, in the present technology, for example, the movable object may further include a learning DNN unit configured to perform learning with the image data of the movement scene to acquire the inference DNN coefficient; and a coefficient transmission unit configured to transmit, to the cloud server, the inference DNN coefficient acquired by the learning DNN unit. With this arrangement, in a case where an inference DNN coefficient cannot be acquired by performing learning due to insufficient collection of image data by the cloud server, the inference DNN coefficient acquired by the learning DNN unit can used as a substitute.

Still furthermore, in the present technology, for example, with the movable object moving in an overlap region between a first area and a second area toward the second area side, when the coefficient reception unit receives, from the cloud server, the inference DNN coefficient corresponding to the second area, the inference DNN unit may make a switch from the inference DNN coefficient corresponding to the first area to the inference DNN coefficient corresponding to the second area. With this arrangement, even in a case where the area in which the movable object is moving changes, it enables to cause the inference DNN with an appropriate coefficient set thereto to function without being affected by a delay in transmission.

Still furthermore, in the present technology, the inference DNN unit may include a first inference DNN and a second inference DNN, the coefficient reception unit may receive, with the movable object moving in a first area, the inference DNN coefficient corresponding to a second area to which the movable object moves next, the inference DNN coefficient corresponding to the first area may be set to the first inference DNN and the inference DNN coefficient corresponding to the second area may be set to the second inference DNN, and when the movable object moves from the first area into the second area, the inference DNN unit may make a switch from the first inference DNN in use to the second inference DNN to be used. With this arrangement, even in a case where the area in which the movable object is moving changes, it enables to cause the inference DNN with an appropriate coefficient set thereto to function without being affected by a delay in transmission.

Still furthermore, in the present technology, the movable object may further include a storage configured to hold the inference DNN coefficient corresponding to an area in which the movable object is moving and the inference DNN coefficient corresponding to another area around the area, the inference DNN coefficients being each received by the coefficient reception unit, and when the movable object moves from a first area into a second area, the inference DNN unit may extract, from the storage, the inference DNN coefficient corresponding to the second area and may use the inference DNN coefficient extracted. With this arrangement, even in a case where the area in which the movable object is moving changes, it enables to cause the inference DNN with an appropriate coefficient set thereto to function without being affected by a delay in transmission.

BRIEF DESCRIPTION OF DRAWINGS

FIG. 4 is a block diagram illustrating a detailed configuration example of a cloud server.

FIG. 10 is a flowchart illustrating an exemplary processing procedure of the coefficient database unit.

FIG. 11 explanatorily illustrates an exemplary method of handling a delay in transmission of a DNN coefficient.

MODE FOR CARRYING OUT THE INVENTION

Hereinafter, a mode for carrying out the invention (hereinafter referred to as an "embodiment") will be described. Note that the description will be given in the following order.

1. Embodiment
2. Modifications

1. Embodiment

[Configuration of Automated Driving System]

Figure 1:
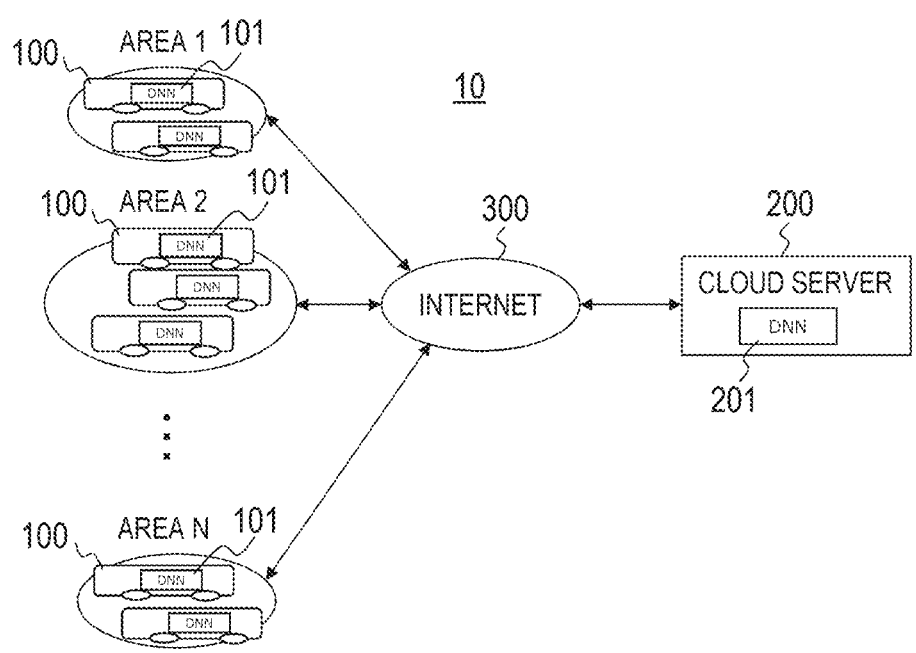
FIG. 1 is a block diagram illustrating a configuration example of an automated driving system as an embodiment.

FIG. 1 illustrates a configuration example of an automated driving system 10 as an embodiment. The automated driving system 10 includes an automobile (hereinafter, appropriately referred to as "automated driving vehicle") 100 that has a plurality of automated driving functions and is connected to a cloud server 200 through an Internet 300.

In a plurality of areas, namely, areas 1, 2, . . . , and N in the illustrated example, automated driving vehicles are traveling. Each automated driving vehicle 100 periodically acquires image data of a scene having an image feature corresponding to the traveling scene, and transmits the image data of the scene to the server 200 through the Internet 300. Here, the image feature corresponding to the traveling scene includes a position element of the traveling scene, for example, information regarding the area in traveling, and includes a weather element, a date-and-time element, and others of the traveling scene.

Each automated driving vehicle 100 includes an inference deep neural network (DNN) unit 101 that identifies an external environment from the image data of the traveling scene. The external environment identified by the inference DNN unit 101 is based on, for example, semantic segmentation or depth. In each automated driving vehicle 100, the power, braking, and others in automated driving are controlled on the basis of the identification result of the external environment by the inference DNN unit 101.

The cloud server 200 includes a learning DNN unit 201. On the basis of the image data transmitted from each automated driving vehicle 100, the learning DNN unit 201 periodically acquires, on an area and weather basis, a DNN coefficient to be set to the inference DNN unit 101 of the automated driving vehicle 100 described above. Then, the cloud server 200 periodically transmits, to each automated driving vehicle 100 through the Internet 300, the DNN coefficient corresponding to the area in which the automated driving vehicle 100 is traveling and corresponding to the weather at that time.

In such a manner, the DNN coefficient corresponding to the area in which each automated driving vehicle 100 is traveling and corresponding to the weather at that time is transmitted from the cloud server 200 to the automated driving vehicle 100. This arrangement enables to enhance the accuracy of the identification result of the external environment by the inference DNN unit 101 of each automated driving vehicle 100. Thus, the power, braking, and others in automated driving can be controlled more accurately.

"Configuration Examples of Automated Driving Vehicle and Cloud Server"

Figure 2:
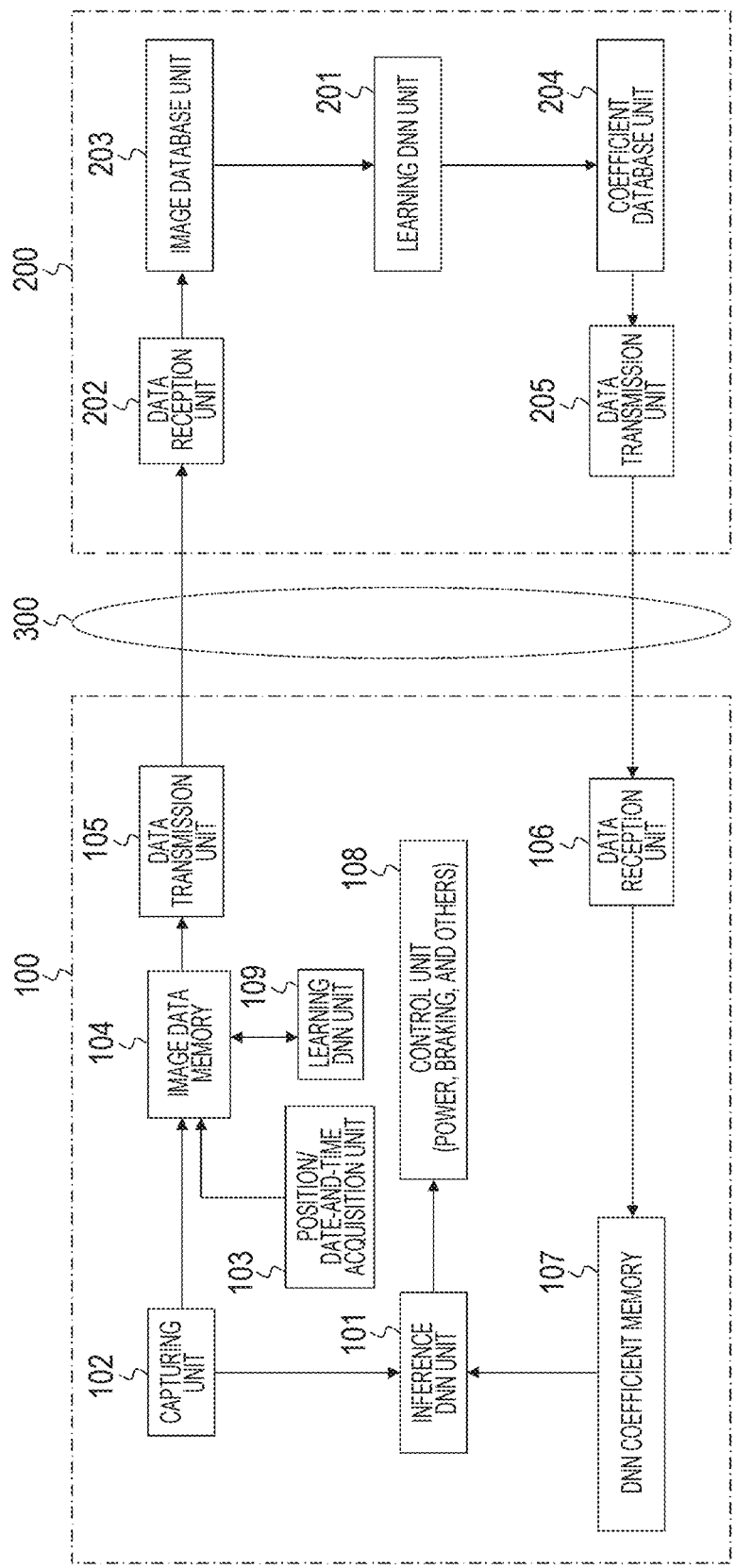
FIG. 2 is a block diagram illustrating configuration examples of an automated driving vehicle and a cloud server.

FIG. 2 illustrates configuration examples of the automated driving vehicle 100 and the cloud server 200. The automated driving vehicle 100 includes the inference DNN unit 101, a capturing unit 102, a position/date-and-time acquisition unit 103, an image data memory 104, a data transmission unit 105, a data reception unit 106, a DNN coefficient memory 107, a control unit 108, and a learning DNN unit 109.

The capturing unit 102 includes a lens, a capturing element such as a CCD image sensor or a CMOS image sensor, and others, and periodically acquires image data corresponding to a traveling scene. The position/date-and-time acquisition unit 103 acquires information regarding the current position using, for example, a global positioning system (GPS). Further, the position/date-and-time acquisition unit 104 acquires information regarding the current date and time from a clock unit (not illustrated).

The image data memory 104 temporarily holds the image data of the traveling scene acquired by the capturing unit 102 with the position information and the date-and-time information acquired by the position/date-and-time acquisition unit 103 added to the image data. The data transmission unit 105 transmits, to the cloud server 200 through the Internet 300, the image data (with the position information and the date-and-time information added to the image data) held in the image data memory 104.

The data reception unit 106 receives a DNN coefficient transmitted from the cloud server 200 through the Internet 300. The DNN coefficient memory 107 temporarily stores the DNN coefficient received by the data reception unit 106. The DNN coefficient stored in the DNN coefficient memory 107 is extracted and set to the inference DNN unit 101.

Figure 3B:
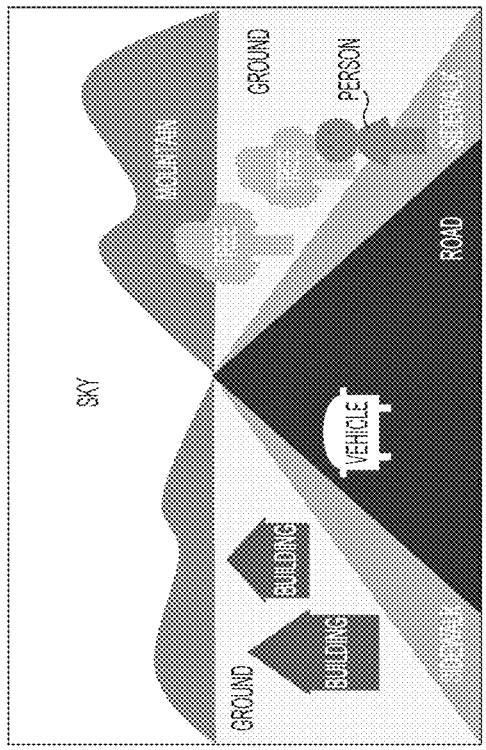
FIGS. 3A and 3B illustrate exemplary image data of a traveling scene and an exemplary identification result based on semantic segmentation for the image data of the traveling scene.
Figure 3A:
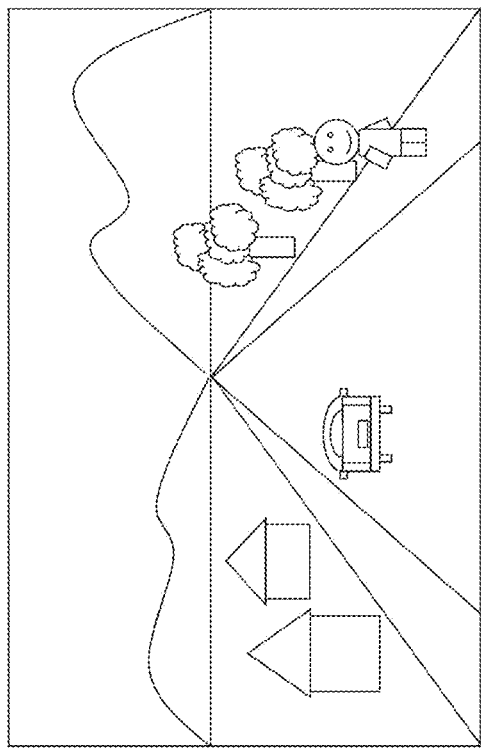

Then, the inference DNN unit 101 identifies an external environment from the image data of the traveling scene acquired by the capturing unit 102. For example, the external environment is identified on the basis of, for example, semantic segmentation or depth. For example, FIG. 3A illustrates exemplary image data of a traveling scene. FIG. 3B illustrates an exemplary identification result based on semantic segmentation for the image data of the traveling scene. On the basis of the identification result of the external environment from the inference DNN unit 101, the control unit 108 controls the power, braking, and others in automated driving.

For example, in a case where communication with the cloud server 200 cannot be established due to no communication network, the learning DNN unit 109 performs learning with the image data stored in the memory 104 as learning data, and then acquires a DNN coefficient. In this case, for example, transfer learning based on the DNN coefficient set to and used by the inference DNN unit 101 is performed in a certain time zone (first time zone), and a DNN coefficient to be used in the next time zone (second time zone) is acquired. This DNN coefficient is a specialization coefficient corresponding to the zone (position) and the weather of the traveling scene.

In a case where communication with the cloud server 200 becomes enabled, the DNN coefficient acquired by the learning DNN unit 109 is transmitted from the data transmission unit 105 to the cloud server 200 through the Internet 300. Alternatively, the DNN coefficient acquired by the learning DNN unit 109 is set to and used by the inference DNN unit 101 in the next time zone.

The cloud server 200 includes the learning DNN unit 201, a data reception unit 202, an image database unit 203, a coefficient database unit 204, and a data transmission unit 205.

"Detailed Configuration Example of Cloud Server"

FIG. 4 illustrates a detailed configuration example of the cloud server 200. The data reception unit 202 receives the image data of the traveling scene (with position information and date-and-time information added to the image data) transmitted from the automated driving vehicle 100 through the Internet 300 by communication such as 5G. Further, the data reception unit 202 receives the DNN coefficient (specialization coefficient) transmitted from the automated driving vehicle 100.

"Description of Image Database Unit"

The image database unit 203 saves, on an area, date and time, and weather basis, the image data of the traveling scene received by the data reception unit 202, on the basis of the position information and the date-and time-information, and the weather information added to the image data. In this case, the weather information can be acquired from a weather information server or can be acquired by analysis of image data. Note that the position information and the date-and-time information are added to the image data of the traveling scene transmitted from the automated driving vehicle 100 in the above description; however, weather information may be further added to the image data.

Further, the image database unit 203 configures and acquires, in a certain time zone, a learning data set on an area and weather basis in order to acquire a DNN coefficient to be used by the inference DNN unit 101 of the automated driving vehicle 100 in the next time zone.

Figure 5:
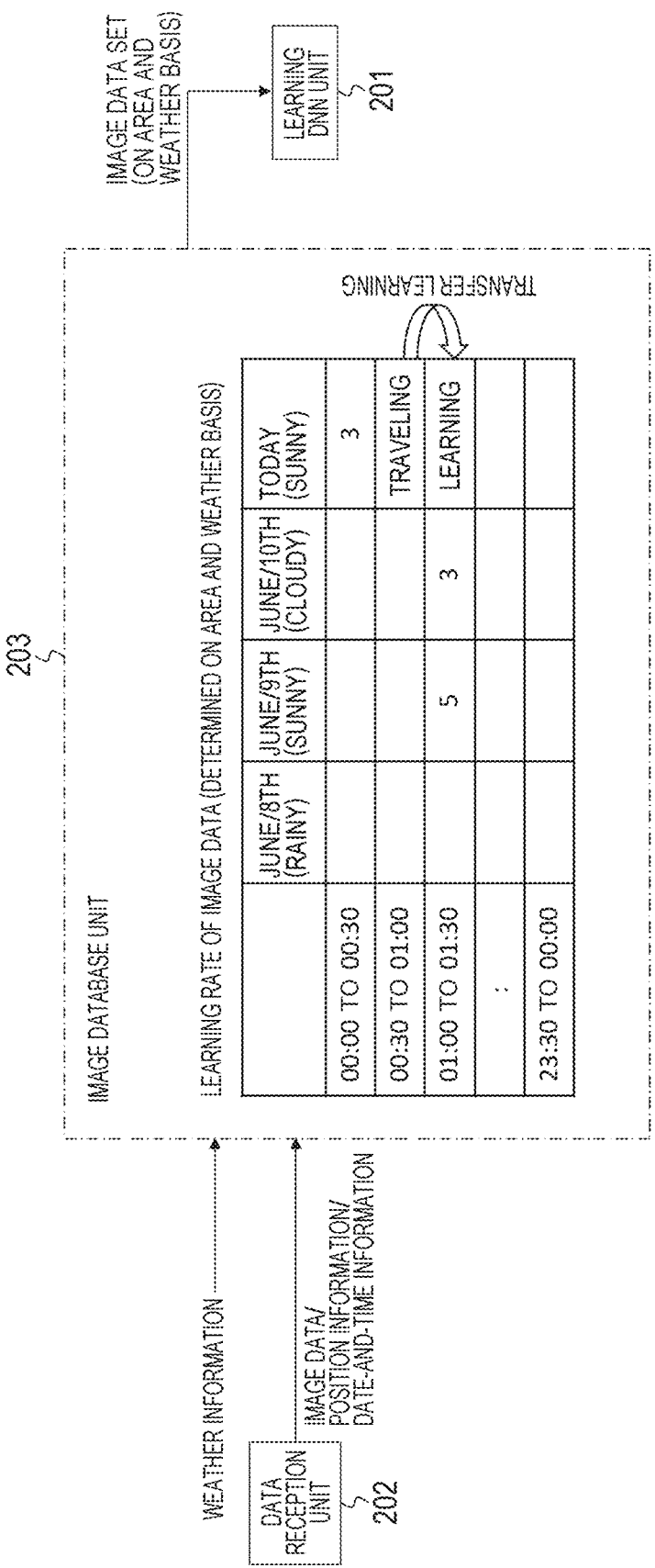
FIG. 5 explanatorily illustrates processing of an image database unit.

FIG. 5 illustrates a configuration example of a learning data set to be used for learning, in the time zone of 00:30 to 01:00 (time zone in traveling), of a DNN coefficient corresponding to sunny weather in a certain area to be used in the next time zone of 01:00 to 01:30. In this example, the rate of the image data for 00:00 to 00:30 today (sunny) is "3", the rate of the image data for 01:00 to 01:30 on June 9th (sunny) is "5", and the rate of the image data for 01:00 to 01:30 on June 10th (cloudy) is "3". The image data for 01:00 to 01:30 on June 8th (rainy) is not used because the weather is totally different.

Note that in this example, the image data for the time zone in traveling today (sunny) is not included in the configuration of the learning data set; however, it is also conceivable to include the image data. Further, it is also conceivable to refer to the date and time in units of years. For example, it is effective in configuration of a learning data set to be used for learning of a DNN coefficient corresponding to the weather on this day (snowy) in an area in which it rarely snows.

Further, in this example, the time zones are set at intervals of 30 minutes. However, the length of such a time zone can be defined in accordance with the calculation speed of learning. Furthermore, in this example, the learning data set includes only the image data of the same area. However, in a case where the number of pieces of image data is small because of including only the image data of the same area, for example, it is also conceivable to refer to image data of the adjacent area.

"Description of Learning DNN Unit"

Referring back to FIG. 4, on the basis of the area-and-weather-based learning data set acquired by the image database unit 203, the learning DNN unit 201 performs learning with a learning DNN on an area and weather basis in a certain time zone, and then acquires a DNN coefficient to be set to and used by the inference DNN unit 101 of the automated driving vehicle 100 in the next time zone.

In this case, transfer learning (unsupervised) based on the DNN coefficient in the certain time zone is performed, and a DNN coefficient to be used in the next time zone is acquired. The change between the traveling scene in the certain time zone and the traveling scene in the next time zone is not so large. Thus, sequential transfer learning enables efficient learning having a higher accuracy in a short time and with a small number of pieces of image data. The learning end condition is determined on the basis of, for example, a predefined period of time for learning or the predefined number of epochs (the number of times of updating the coefficient).

Figure 6:
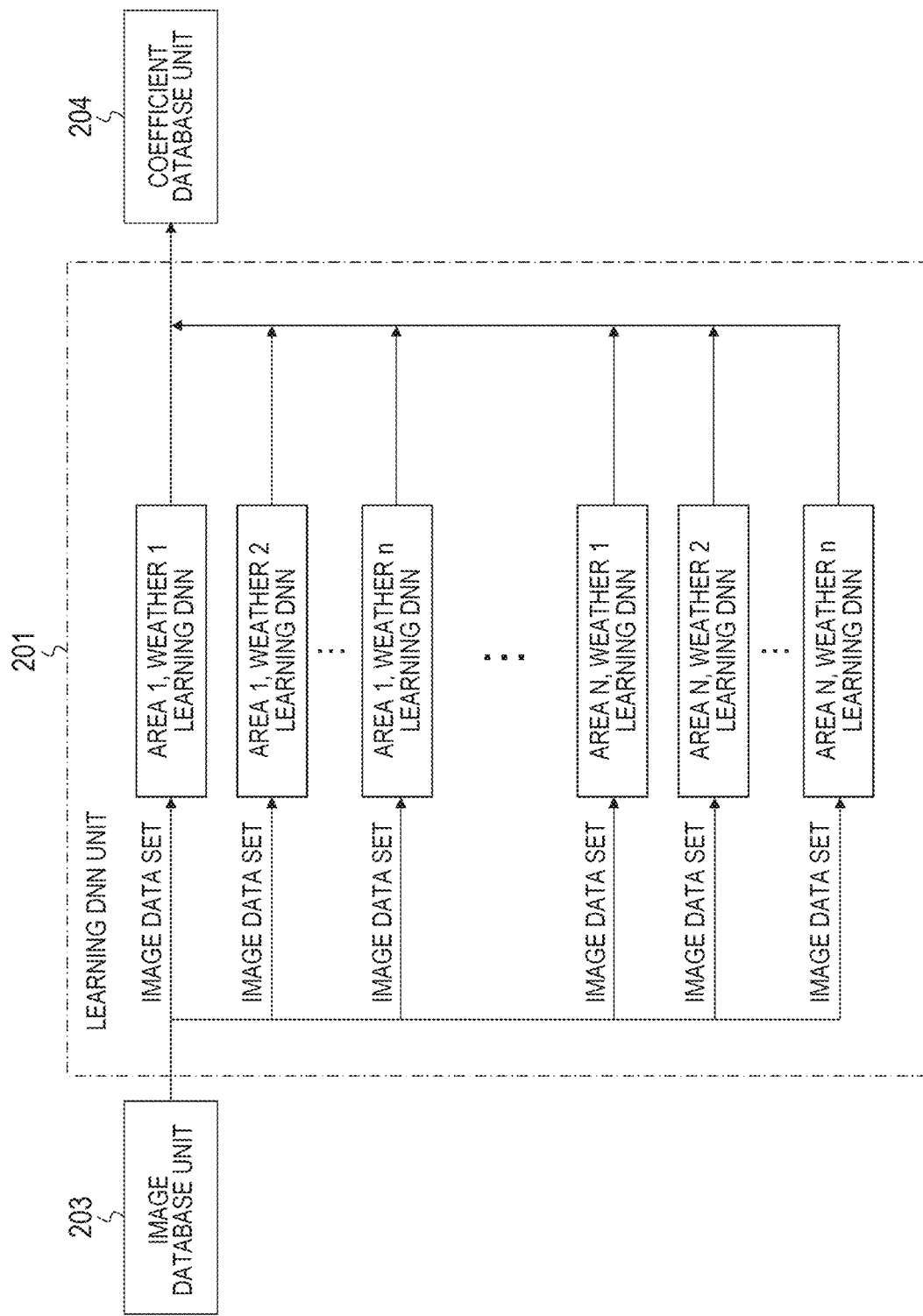
FIG. 6 is a block diagram illustrating a detailed configuration example of a learning DNN unit.

FIG. 6 illustrates a detailed configuration example of the learning DNN unit 201. The learning DNN unit 201 includes the area-and-weather-based learning DNN, and performs distributed learning in which area-and-weather-based learning is performed in parallel. This distributed learning enables an increase in the overall calculation speed. The illustrated example indicates a case where the areas are 1 to N and the types of weather is 1 to n. It is conceivable that the types of weather include sunny, cloudy, rainy, snowy, and others.

Note that in the above description, in a certain time zone today, performed is learning of the DNN coefficients of each area corresponding to all the types of weather in the next time zone. However, it is also conceivable to omit learning of the DNN coefficients for the types of weather not corresponding at all in each area today. For example, in a case where the corresponding type of weather is only sunny in each area today, learning of the DNN coefficients corresponding to the other types of weather such as cloudy, rainy, and snowy is meaningless, and thus may be omitted.

"Description of Coefficient Database Unit"

Referring back to FIG. 4, the coefficient database unit 204 temporarily stores such an area-and-weather-based DNN coefficient (specialization coefficient) to be set to and used by the inference DNN unit 101 of the automated driving vehicle 100 next in a time zone, which is acquired by the learning DNN unit 201 in a certain time zone. Further, the coefficient database unit 204 also temporarily stores the DNN coefficient (specialization coefficient) transmitted from the automated driving vehicle 100.

Furthermore, the coefficient database unit 204 determines and transmits a DNN coefficient to be transmitted to each automated driving vehicle 100. In this case, basically, the area-and-weather-based DNN coefficient, that is, the specialization coefficient is determined as the DNN coefficient to be transmitted. However, in a case where evaluation is performed on the basis of the loss function of the DNN and the evaluation value of the specialization coefficient is lower than that of the general-purpose coefficient, the general-purpose coefficient is determined as the DNN coefficient to be transmitted instead of the specialization coefficient. Here, the general-purpose coefficient is a DNN coefficient obtained by learning in advance with image data of a traveling scene satisfying a wide variety of conditions (position, weather, date and time, and others), and is a DNN coefficient that can correspond to the wide variety of conditions.

Figure 7:
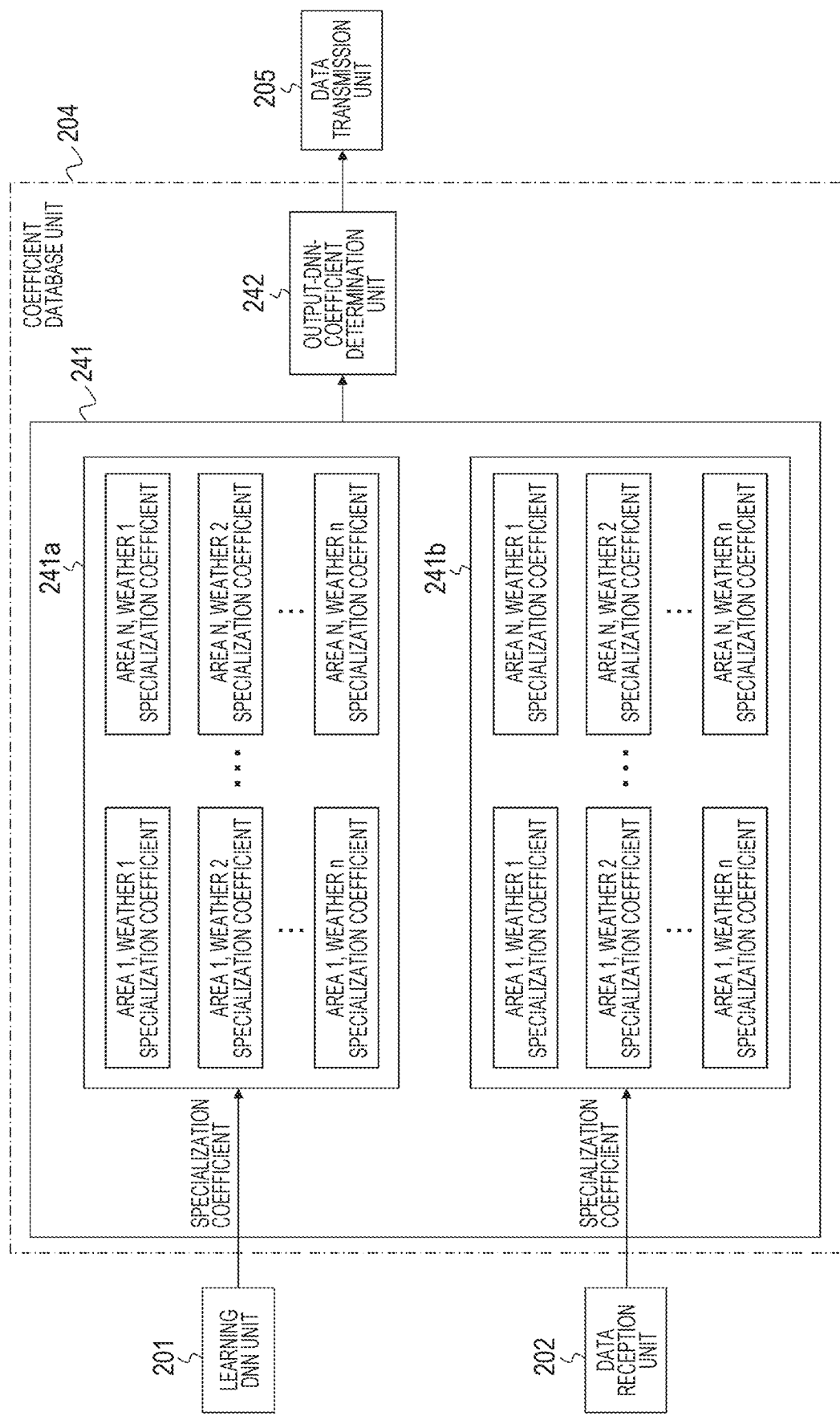
FIG. 7 is a block diagram illustrating a detailed configuration example of a coefficient database unit.

FIG. 7 illustrates a detailed configuration example of the coefficient database unit 204. The coefficient database unit 204 includes a storage unit 241 that stores such DNN coefficients, and a DNN-coefficient determination unit 242 that determines and outputs a DNN coefficient to be transmitted to each automated driving vehicle 100. In addition, the storage unit 241 includes a storage unit 241a that temporarily stores the area-and-weather-based DNN coefficient (specialization coefficient) acquired by the learning DNN unit 201, and a storage unit 241b that temporarily stores the area-and-weather-based DNN coefficient (specialization coefficient) received by the data reception unit 202.

Further, the DNN-coefficient determination unit 242 basically determines the area-and-weather-based DNN coefficient as a DNN coefficient in the next time zone to be transmitted to each automated driving vehicle 100, extracts the determined DNN coefficient from the storage unit 241, and then outputs the extracted DNN coefficient as the DNN coefficient to be transmitted. In this case, the determined DNN coefficient is basically extracted from the storage unit 241a. However, in a case where the DNN coefficient is absent in the storage unit 241a (corresponding to a case where learning cannot be performed due to a system failure or the like), if the DNN coefficient is present in the storage unit 241b, the DNN coefficient is extracted from the storage unit 241b.

Note that in a case where the determined DNN coefficient is present in both the storage unit 241a and the storage unit 241b, it is also conceivable that the DNN-coefficient determination unit 242 is configured to output the DNN coefficient higher in evaluation value, as the DNN coefficient to be transmitted.

In this embodiment, actually, the DNN-coefficient determination unit 242 outputs, as a DNN coefficient to be transmitted, the DNN coefficient extracted from the storage unit 241. In other words, only when the evaluation value of the specialization coefficient is higher than that of the general-purpose coefficient, the DNN-coefficient determination unit 242 outputs the specialization coefficient as a DNN coefficient to be transmitted. When the evaluation value of the specialization coefficient is lower than that of the general-purpose coefficient, the general-purpose coefficient is output as a DNN coefficient to be transmitted.

As a case where the evaluation value of the specialization coefficient is lower than that of the general-purpose coefficient, for example, assumed is a case where the number of pieces of image data for learning is insufficient and sufficient learning cannot be performed. As a result, when the specialization coefficient is an inappropriate DNN coefficient, it can be avoided that the DNN coefficient is used on the automated driving vehicle 100 side.

Further, the DNN-coefficient determination unit 242 may be configured to output the general-purpose coefficient as the DNN coefficient to be transmitted in a case where the determined DNN coefficient is absent in the storage unit 241 (storage unit 241a or 241b).

Referring back to FIG. 4, the data transmission unit 205 transmits the DNN coefficient (specialization coefficient or general-purpose coefficient) determined by the coefficient database unit 204 to each automated driving vehicle 100 through the Internet 300. In this case, the DNN coefficient to be used in the next time zone is transmitted to each automated driving vehicle 100 in a certain time zone.

Note that in the above description, the coefficient database unit 204 outputs the general-purpose coefficient as the DNN coefficient to be transmitted when the evaluation value of the specialization coefficient is lower and the data transmission unit 205 transmits the general-purpose coefficient to the automated driving vehicle 100. However, it is also conceivable that the coefficient database unit 204 is configured to output a command for instructing use of the general-purpose coefficient, when the evaluation value of the specialization coefficient is lower, and the data transmission unit 205 transmits the command to the automated driving vehicle 100. In that case, according to the command, the automated driving vehicle 100 uses a general-purpose coefficient that the automated driving vehicle 100 has.

It is also conceivable that the coefficient database unit 204 is configured to constantly output the specialization coefficient without comparing the evaluation value of the specialization coefficient with that of the general-purpose coefficient, the data transmission unit 205 is configured to transmit the specialization coefficient to the automated driving vehicle 100, and the automated driving vehicle 100 is configured to compare the evaluation value of the specialization coefficient with that of the general-purpose coefficient to determine which to use.

Note that in a case where the coefficient database unit 204 outputs the general-purpose coefficient as a DNN coefficient of certain area and weather, it is conceivable that the learning DNN unit 201 performs transfer learning based on the general-purpose coefficient in a case where the DNN coefficient in the next time zone of the area and weather is acquired.

"Exemplary Processing Procedures of Image database Unit, Learning DNN Unit, and Coefficient Database Unit"

Figure 8:
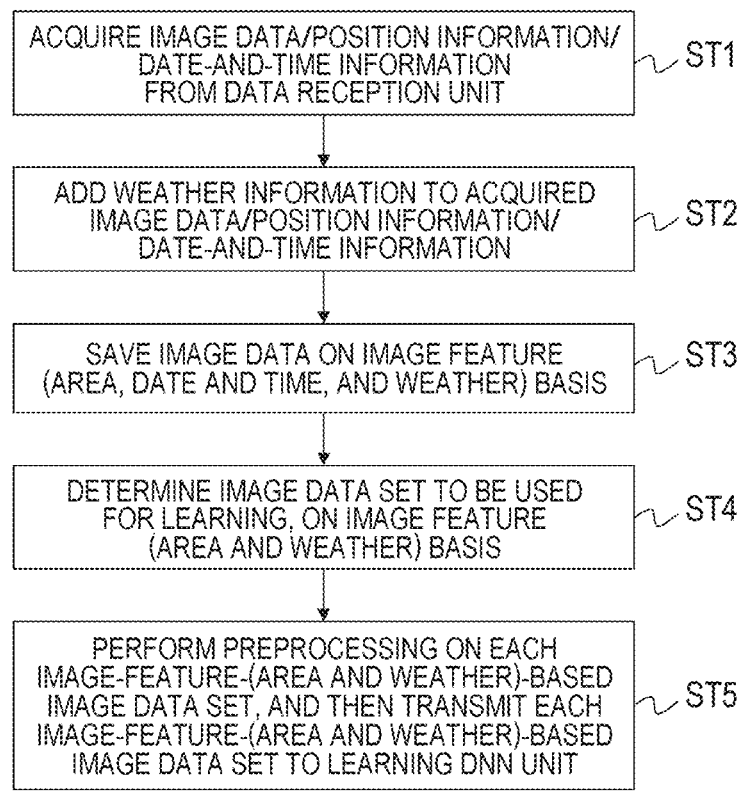
FIG. 8 is a flowchart illustrating an exemplary processing procedure of the image database unit.

The flowchart of FIG. 8 illustrates an exemplary processing procedure of the image database unit 203. In step ST1, the image database unit 203 acquires, from the data reception unit 202, image data of a traveling scene (with position information and date-and-time information added to the image data) of each automated driving vehicle 100. Next, in step ST2, the image database unit 203 adds weather information to the acquired image data of the traveling scene (with position information and date-and-time information added to the image data) of each automated driving vehicle 100.

Next, in step ST3, the image database unit 203 saves, on an image feature (area, date and time, and weather) basis, the acquired image data of the traveling scene of each automated driving vehicle 100. Next, in step ST4, the image database unit 203 determines, on an image feature (area and weather) basis, an image data set for learning of a DNN coefficient in the next time zone (see FIG. 5).

Next, in step ST5, the image database unit 203 performs preprocessing on each image-feature-(area and weather)-based image data set and transmits each image-feature-(area and weather)-based image data set to the learning DNN unit 201. For example, the preprocessing includes processing of cutting image data into patches, processing of normalizing pixel values, and processing of shuffling the order. This is preprocessing typically performed for learning regarding image data.

Figure 9:
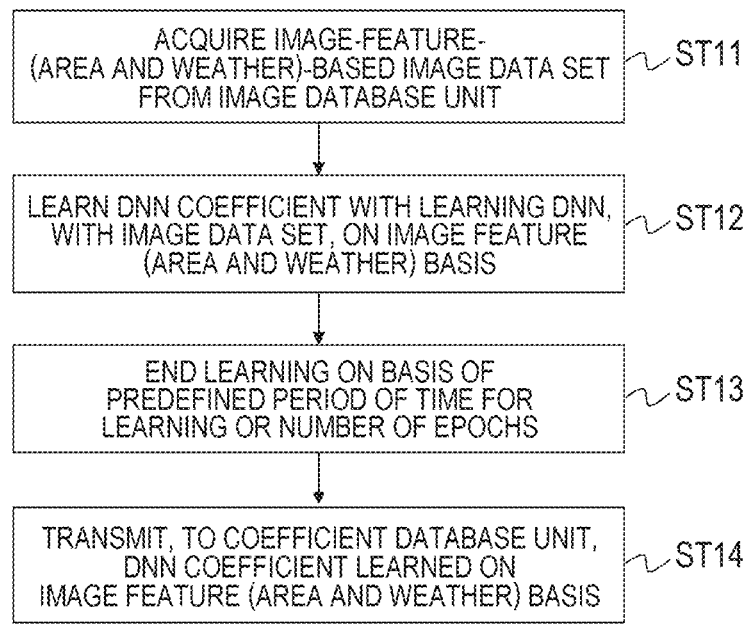
FIG. 9 is a flowchart illustrating an exemplary processing procedure of the learning DNN unit.

The flowchart of FIG. 9 illustrates an exemplary processing procedure of the learning DNN unit 201. In step ST11, the learning DNN unit 201 acquires the image-feature-(area and weather)-based image data set from the image database unit 203. Next, in step ST12, with the image data set, the learning DNN unit 201 learns (transfer-learns) the DNN coefficient with the learning DNN, on an image feature (area and weather) basis.

Next, in step ST13, the learning DNN unit 201 ends the learning on the basis of a predefined period of time for learning or the number of epochs. Next, in step ST14, the learning DNN unit 201 transmits, to the coefficient database unit 204, the DNN coefficient learned on the image feature (area and weather) basis.

The flowchart of FIG. 10 illustrates an exemplary processing procedure of the coefficient database unit 204. In step ST21, the coefficient database unit 204 acquires, from the learning DNN unit 201, the DNN coefficient learned on the image feature (area and weather) basis. Next, in step ST22, the coefficient database unit 204 saves the acquired DNN coefficient to which information regarding the image feature (area and weather) is added.

Next, in step ST23, the coefficient database unit 204 evaluates whether or not the acquired DNN coefficient (specialization coefficient) is higher in accuracy than the general-purpose coefficient. This evaluation is performed on the basis of a loss function. Next, in step ST24, the coefficient database unit 204 transmits the acquired DNN coefficient (specialization coefficient) to the data transmission unit 205 if the accuracy is higher in accuracy, otherwise transmits the general-purpose coefficient to the data transmission unit 205 if the accuracy is not higher or transmits a command for use of the in-vehicle general-purpose coefficient to the data transmission unit 205.

"Method of Handling Delay in Transmission of DNN Coefficient"

In a case where a delay occurs in transmission of a DNN coefficient from the cloud server 200 to the automated driving vehicle 100, there are areas between which the automated driving vehicle 100 cannot receive the DNN coefficient corresponding to the traveling area. As a method of handling such a delay in transmission, for example, the following (1) to (3) are conceivable. With these methods of handling, even in a case where the area in which the automated driving vehicle 100 is traveling changes, it enables to cause the inference DNN with an appropriate DNN coefficient set thereto to function without being affected by a delay in transmission.

(1) In this method, an overlap region is provided between an area and another area, and a switch is made between DNN coefficients within this region. In this case, with the automated driving vehicle 100 moving in the overlap region between a first area and a second area toward the second area side, when the data reception unit 106 receives, from the cloud server 200, a coefficient corresponding to the second area, the inference DNN unit 101 of the automated driving vehicle 100 makes a switch from a DNN coefficient corresponding to the first area to the DNN coefficient corresponding to the second area.

(2) In this method, an area (region) as a movement destination is predicted on the basis of a travel direction of the automated driving vehicle 100, a coefficient corresponding to the area as the movement destination is applied in advance to two separately prepared inference DNNs, and a switch is made to the inference DNN to be used, when the automated driving vehicle 100 crosses the area or travels in the overlap region. In this case, the inference DNN unit 101 includes a first inference DNN and a second inference DNN, and the data reception unit 106 receives, with the automated driving vehicle 100 moving in the first area, a DNN coefficient corresponding to the second area to which the automated driving vehicle 100 moves next. Then, the DNN coefficient of the first area is set to the first inference DNN, and the DNN coefficient of the second area is set to the second inference DNN. When the automated driving vehicle 100 moves from the first area into the second area, the inference DNN unit 101 makes a switch from the first inference DNN in use to the second inference DNN to be used.

(3) In this method, on the automated driving vehicle 100 side, DNN coefficients of a wide range including an area in traveling are held in a storage in advance. When the automated driving vehicle 100 crosses the area or travels in the overlap region, a switch is made to a DNN coefficient to be used by the inference DNN unit 101. In this case, the automated driving vehicle 100 includes a storage that holds a DNN coefficient corresponding to an area in which the automated driving vehicle 100 is moving and a DNN coefficient corresponding to another area around the area, and the inference DNN coefficients are each received by the data reception unit 106. When the automated driving vehicle 100 moves into the second area from the first area in which the automated driving vehicle 100 is traveling, the inference DNN unit 101 extracts the DNN coefficient of the second area from the storage and uses the DNN coefficient extracted.

In this case, the range of the DNN coefficients held in the storage changes in accordance with traveling of the automated driving vehicle 100. In FIG. 11, the ellipse with a broken line indicates an area in which the automated driving vehicle 100 is traveling, and each ellipse with a solid line indicates an area around the area of which the DNN coefficient is held in the storage in advance. Note that in the illustrated example, the overlap regions between the areas are present; however, it is also conceivable that no overlap region is present.

"Hardware Configuration Example of Cloud Server"

Figure 12:
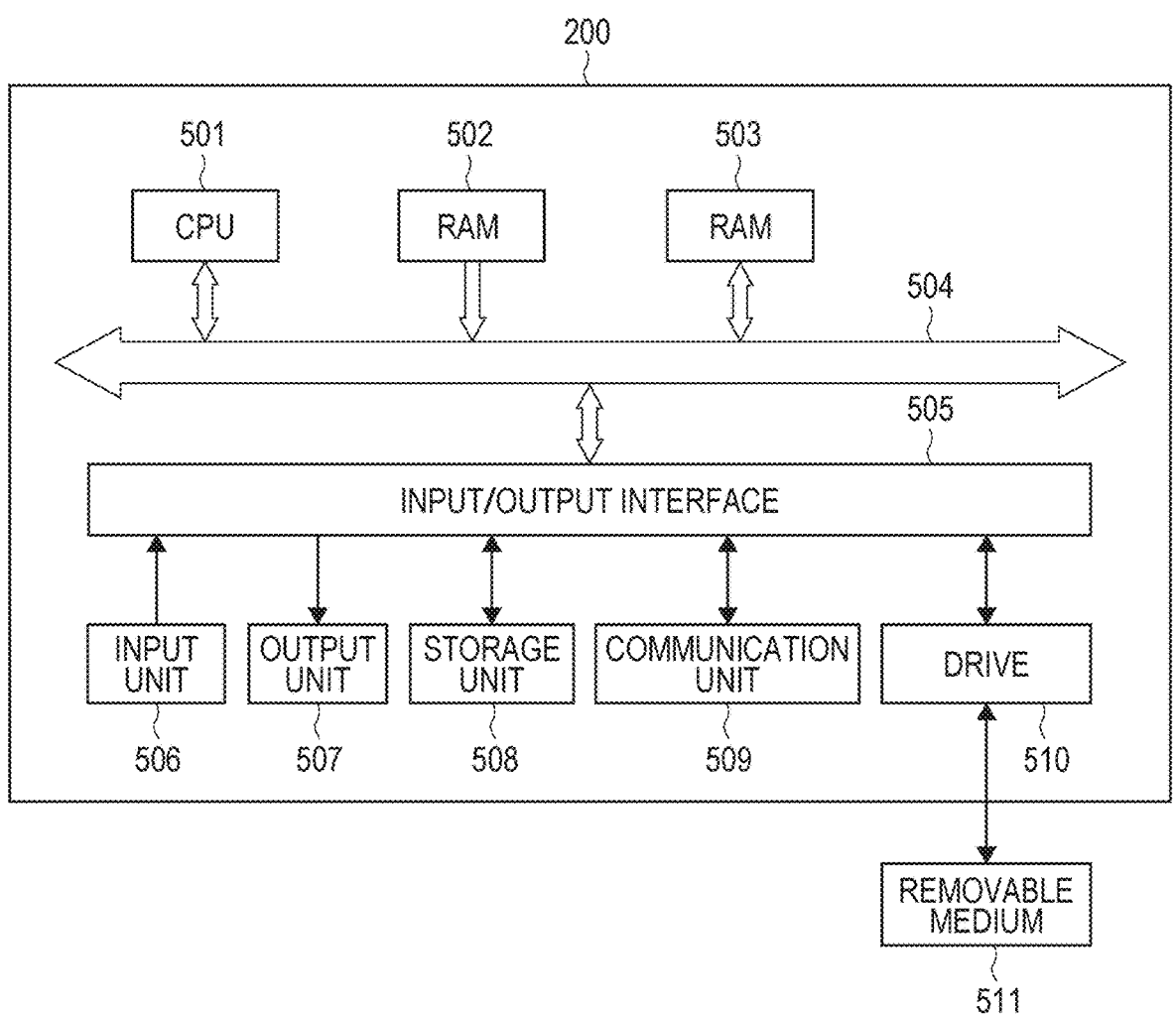
FIG. 12 is a block diagram illustrating a hardware configuration example of the cloud server.

FIG. 12 is a block diagram illustrating a hardware configuration example of the cloud server 200. In the cloud server 200, a central processing unit (CPU) 501, a read only memory (ROM) 502, and a random access memory (RAM) 503 are mutually connected through a bus 504 Further, an input/output interface 505 is connected to the bus 504. An input unit 506, an output unit 507, a storage unit 508, a communication unit 509, and a drive 510 are connected to the input/output interface 505.

The input unit 506 includes a keyboard, a mouse, and a microphone. The output unit 507 includes a display and a speaker. The storage unit 508 includes a hard disk or a non-volatile memory. The communication unit 509 includes a network interface. The drive 510 drives a removable medium 511 such as a magnetic disk, an optical disk, a magneto-optical disk, or a semiconductor memory.

In the cloud server 200 having the configuration as above, the CPU 501 loads, for example, a program stored in the storage unit 508, into the RAM 503 through the input/output interface 505 and the bus 504 to execute the program, so that the series of processing described above is performed.

The program executed by the CPU 501 can be provided by being recorded on, for example, the removable medium 511 as a package medium or the like. Alternatively, the program can be provided through a wired or wireless transmission medium such as a local area network, an Internet, or digital satellite broadcasting.

In the cloud server 200, the program can be installed in the storage unit 508 through the input/output interface 505 by attachment of the removable medium 511 to the drive 510. Alternatively, the program can be received by the communication unit 509 through the wired or wireless transmission medium and can be installed in the storage unit 508. In addition, the program can be preinstalled in the ROM 502 or the storage unit 508.

Note that the program executed by the CPU 501 may be a program for chronologically performing the processing in accordance with the order described in the present specification, may be a program for parallelly performing the processing or a program for performing the processing with necessary timing, for example, when a call is made.

As above, in the automated driving system 10 illustrated in FIG. 1, the DNN coefficient (specialization coefficient) corresponding to the area in which each automated driving vehicle 100 is traveling and corresponding to the weather at that time is transmitted from the cloud server 200 to the automated driving vehicle 100. This arrangement enables to enhance the accuracy of the identification result of the external environment by the inference DNN unit 101 of each automated driving vehicle 100. Thus, the power, braking, and others in automated driving can be controlled more accurately.

2. Modifications

Note that in the above embodiment, an area is not particularly mentioned; however, for a dangerous area, it is also conceivable to perform learning with the area narrowed in range. Learning with an area narrowed in range in such a manner enables an increase in the accuracy of the learned DNN coefficient.

Further, in the above embodiment, the example in which the movable object is the automobile 100 is given. The present technology, however, is similarly applicable even if the movable object is, for example, an autonomous traveling robot, a flight object such as a drone, or the like. For example, in the case of a flight object such as a drone, it is also conceivable to define an image feature regarding the altitude of flight. For example, an altitude of 0 to 2 m is close to a human's viewpoint, and an altitude of not less than several tens of meters is a scene of aerial capturing.

The preferred embodiment of the present disclosure has been described in detail with reference to the accompanying drawings; however, the technical scope of the present disclosure is not limited to the examples. It is obvious that persons having ordinary knowledge in the technical field of the present disclosure can conceive various types of alternations or modifications within the scope of the technical idea described in the claims, and thus it is also naturally understood that such alternations or modifications belong to the technical scope of the present disclosure.

Further, the effects described in the present specification are merely explanatory or exemplary, and thus are not limitative. That is, the technology according to the present disclosure can exhibit other effects obvious to those skilled in the art from the description of the present specification, together with or instead of the above effects.

Note that the present technology can also adopt the following configurations.

(1) An information processing apparatus including:
an image-data acquisition unit configured to acquire image data having an image feature corresponding to a movement scene of a movable object; and
a learning DNN unit configured to perform learning with the image data acquired by the image-data acquisition unit to acquire an inference DNN coefficient for identification of an external environment of the movable object from the image data of the movement scene.

(2) The information processing apparatus according to (1) described above,
in which the image feature includes a position element.

(3) The information processing apparatus according to (2) described above,
in which the image feature further includes a weather element.

(4) The information processing apparatus according to (2) or (3) described above,
in which the image feature further includes a date-and-time element.

(5) The information processing apparatus according to any of (1) to (4) described above,
in which on the basis of the inference DNN coefficient in a first time zone, the learning DNN unit performs transfer learning with the image data acquired by the image-data acquisition unit to acquire the inference DNN coefficient to be used in a second time zone following the first time zone.

(6) The information processing apparatus according to any of (1) to (5) described above, further including:
an image-data reception unit configured to receive, from the movable object, the image data of the movement scene with position information and date-and-time information added to the image data.

(7) The information processing apparatus according to any of (1) to (6) described above, further including:
a coefficient transmission unit configured to transmit, to the movable object, the inference DNN coefficient acquired by the learning DNN unit.

(8) The information processing apparatus according to (7) described above,
in which when an evaluation value of the inference DNN coefficient acquired by the learning DNN unit is higher than an evaluation value of a general-purpose coefficient, the coefficient transmission unit transmits, to the movable object, the inference DNN coefficient acquired by the learning DNN unit.

(9) An information processing method including:
a procedure of acquiring image data having an image feature corresponding to a movement scene of a movable object; and
a procedure of performing learning with the image data acquired to acquire an inference DNN coefficient for identification of an external environment of the movable object from the image data of the movement scene.

(10) A program for causing a computer to function as:
image-data acquisition means configured to acquire image data having an image feature corresponding to a movement scene of a movable object; and
learning DNN means configured to perform learning with the image data acquired by the image-data acquisition means to acquire an inference DNN coefficient for identification of an external environment of the movable object from the image data of the movement scene.

(11) A movable object including:
an inference DNN unit configured to identify an external environment from image data of a movement scene;
a control unit configured to control movement on the basis of an identification result from the inference DNN unit; and
a coefficient reception unit configured to receive, from a cloud server, an inference DNN coefficient to be used by the inference DNN unit,
in which the inference DNN coefficient has been acquired by performing learning with the image data having an image feature corresponding to the movement scene.

(12) The movable object according to (11) described above, further including:
an image-data transmission unit configured to transmit, to the cloud server, the image data of the movement scene with position information and date-and-time information added to the image data.

(13) The movable object according to (11) or (12) described above, further including:
a learning DNN unit configured to perform learning with the image data of the movement scene to acquire the inference DNN coefficient; and
a coefficient transmission unit configured to transmit, to the cloud server, the inference DNN coefficient acquired by the learning DNN unit.

(14) The movable object according to any of (11) to (13) described above,
in which with the movable object moving in an overlap region between a first area and a second area toward the second area side, when the coefficient reception unit receives, from the cloud server, the inference DNN coefficient corresponding to the second area, the inference DNN unit makes a switch from the inference DNN coefficient corresponding to the first area to the inference DNN coefficient corresponding to the second area.

(15) The movable object according to any of (11) to (13) described above,
in which the inference DNN unit includes a first inference DNN and a second inference DNN,
the coefficient reception unit receives, with the movable object moving in a first area, the inference DNN coefficient corresponding to a second area to which the movable object moves next,
the inference DNN coefficient corresponding to the first area is set to the first inference DNN and the inference DNN coefficient corresponding to the second area is set to the second inference DNN, and when the movable object moves from the first area into the second area, the inference DNN unit makes a switch from the first inference DNN in use to the second inference DNN to be used.

(16) The movable object according to any of (11) to (13), further including:

a storage configured to hold the inference DNN coefficient corresponding to an area in which the movable object is moving and the inference DNN coefficient corresponding to another area around the area, the inference DNN coefficients being each received by the coefficient reception unit, in which when the movable object moves from a first area into a second area, the inference DNN unit extracts, from the storage, the inference DNN coefficient corresponding to the second area and uses the inference DNN coefficient extracted.

REFERENCE SIGNS LIST

10 Automated driving system
100 Automated driving vehicle
101 Inference DNN unit
102 Capturing unit
103 Position/date-and-time acquisition unit
104 Image data memory
105 Data transmission unit
106 Data reception unit
107 DNN coefficient memory
108 Control unit
109 Learning DNN unit
200 Cloud server
201 Learning DNN unit
202 Data reception unit
203 Image database unit
204 Coefficient database unit
205 Data transmission unit
241, 241a, 241b Storage unit
242 Output-DNN-coefficient determination unit
300 Internet

The invention claimed is:

1. An information processing apparatus, comprising:
a memory configured to store instructions; and
a central processing unit (CPU) configured to execute the instructions, and based on the executed instructions, the CPU is further configured to:
 acquire image data that includes an image feature, wherein
  the image feature corresponds to a movement scene of a vehicle, and
  the image feature includes date-and-time information of the movement scene and weather information of the movement scene;
 execute a learning process based on the acquired image data;
 acquire a first inference deep neural network (DNN) coefficient based on the execution of the learning process;
 transmit the acquired first inference DNN coefficient to the vehicle for identification of an external environment of the vehicle from the image data of the movement scene:
 based on the first inference DNN coefficient in a first time zone, execute transfer learning with the acquired image data; and
 acquire a second inference DNN coefficient for a second time zone based on the execution of the transfer learning, wherein
  the second time zone follows the first time zone, and
  the second inference DNN coefficient is different from the first inference DNN coefficient.

2. The information processing apparatus according to claim 1, wherein the image feature further includes position information of the movement scene.

3. The information processing apparatus according to claim 1, wherein the image data of the movement scene further includes position information of the vehicle.

4. The information processing apparatus according to claim 1, wherein the CPU is further configured to:
 determine an evaluation value of the first inference DNN coefficient is higher than an evaluation value of a general-purpose coefficient; and
 transmit, to the vehicle, the first inference DNN coefficient based on the determination that the evaluation value of the first inference DNN coefficient is higher than the evaluation value of the general-purpose coefficient.

5. An information processing method, comprising:
in an information processing apparatus:
 acquiring image data that includes an image feature, wherein
  the image feature corresponds to a movement scene of a vehicle, and
  the image feature includes date-and-time information of the movement scene and weather information of the movement scene;
 executing a learning process based on the acquired image data;
 acquiring a first inference deep neural network (DNN) coefficient based on the execution of the learning process;
 transmitting the acquired first inference DNN coefficient to the vehicle for identification of an external environment of the vehicle from the image data of the movement scene;
 based on the first inference DNN coefficient in a first time zone, executing transfer learning with the acquired image data; and
 acquiring a second inference DNN coefficient for a second time zone based on the execution of the transfer learning, wherein
  the second time zone follows the first time zone, and
  the second inference DNN coefficient is different from the first inference DNN coefficient.

6. A non-transitory computer-readable medium having stored thereon, computer-executable instructions which, when executed by an information processing apparatus, cause the information processing apparatus to execute operations, the operations comprising:
 acquiring image data that includes an image feature, wherein
  the image feature corresponds to a movement scene of a vehicle, and
  the image feature includes date-and-time information of the movement scene and weather information of the movement scene;
 executing a learning process based on the acquired image data;
 acquiring a first inference deep neural network (DNN) coefficient based on the execution of the learning process;
 transmitting the acquired first inference DNN coefficient to the vehicle for identification of an external environment of the vehicle from the image data of the movement scene;

based on the first inference DNN coefficient in a first time zone, executing transfer learning with the acquired image data; and acquiring a second inference DNN coefficient for a second time zone based on the execution of the transfer learning, wherein the second time zone follows the first time zone, and the second inference DNN coefficient is different from the first inference DNN coefficient.

7. A vehicle, comprising:

a first memory configured to store instructions; and a central processing unit (CPU) configured to execute the instructions, and based on the executed instructions, the CPU is further configured to:

transmit, to a cloud server, image data which includes an image feature, wherein the image feature corresponds to a movement scene of the vehicle, and the image feature includes date-and-time information of the movement scene and weather information of the movement scene;

receive, from the cloud server, a first inference deep neural network (DNN) coefficient based on the image feature included in the transmitted image data, wherein the first inference DNN coefficient is based on a first learning process of the image data;

identify an external environment of the vehicle from the image data of the movement scene based on the received first inference DNN coefficient;

control movement of the vehicle based on an identification result of the identification of the external environment:

based on the first inference DNN coefficient in a first time zone, execute transfer learning with the image data; and acquire a second inference DNN coefficient for a second time zone based on the execution of the transfer learning, wherein the second time zone follows the first time zone, and the second inference DNN coefficient is different from the first inference DNN coefficient.

8. The vehicle according to claim 7, wherein the image data of the movement scene further includes position information of the vehicle.

9. The vehicle according to claim 7, wherein the CPU is further configured to:

transmit, to the cloud server, the second inference DNN coefficient.

10. The vehicle according to claim 7, wherein the CPU is further configured to:

detect a movement of the vehicle in an overlap region between a first area and a second area; and switch from the first inference DNN coefficient, corresponding to the first area, to the second inference DNN coefficient corresponding to the second area.

11. The vehicle according to claim 7, further comprising:

a first inference DNN and a second inference DNN, wherein the vehicle is configured to move from a first area to a second area, the first area corresponds to the first inference DNN coefficient, the second inference DNN coefficient corresponds to the second area, and the CPU is further configured to:

set the first inference DNN coefficient, corresponding to the first area, to the first inference DNN;

set the second inference DNN coefficient, corresponding to the second area, to the second inference DNN; and based on the movement of the vehicle from the first area to the second area, switch from the first inference DNN to the second inference DNN.

12. The vehicle according to claim 7, further comprising:

a second memory, wherein the vehicle is configured to move in a first area, the second memory is configured to:

store the first inference DNN coefficient corresponding to the first area; and store the second inference DNN coefficient corresponding to a second area around the first area, the vehicle is further configured to move from the first area to the second area, and the CPU is further configured to based on the movement of the vehicle from the first area into the second area, extract, from the memory, the second inference DNN coefficient corresponding to the second area; and identify the external environment of the vehicle from the image data of the movement scene based on the extracted second inference DNN coefficient.

* * * * *